Oct. 20, 1931.   H. E. CROSBY   1,828,175
GANG FAUCET
Filed Oct. 20, 1930   2 Sheets-Sheet 1

HARRY E. CROSBY
INVENTOR

PER Minier and Fike
ATTORNEYS

Oct. 20, 1931.   H. E. CROSBY   1,828,175
GANG FAUCET
Filed Oct. 20, 1930   2 Sheets-Sheet 2

HARRY E. CROSBY
INVENTOR

PER Minier and Fihr
ATTORNEYS

Patented Oct. 20, 1931

1,828,175

UNITED STATES PATENT OFFICE

HARRY E. CROSBY, OF HUNTINGTON PARK, CALIFORNIA, ASSIGNOR TO MISSION DRY CORPORATION, LTD., OF LOS ANGELES, CALIFORNIA, A CORPORATION OF DELAWARE

GANG FAUCET

Application filed October 20, 1930. Serial No. 489,992.

This invention relates to an improved gang faucet, and has for one of its principal objects the provision of a unitary faucet having a plurality of ports from which a corresponding number of liquids or fluids may be dispensed, either mixed together or with each other, and also in desired proportion.

One of the important objects of this invention is the provision in a gang faucet of means for dispensing a plurality of liquids such as beverages or the like, and at the same time mixing the same, such as for example a beverage extract with water so as to provide a suitable drink or drinks.

Another and further important object of the invention is to provide a faucet for use with a beverage dispenser or the like whereby any one of a plurality of beverages can be dispensed from the same faucet and from different compartments in the same container with a minimum of effort and with a positive operation.

Other and further important objects of the invention will be apparent from the disclosures in the accompanying drawings and following specification.

The invention, in a preferred form, is illustrated in the drawings and hereinafter more fully described.

Figure 1:
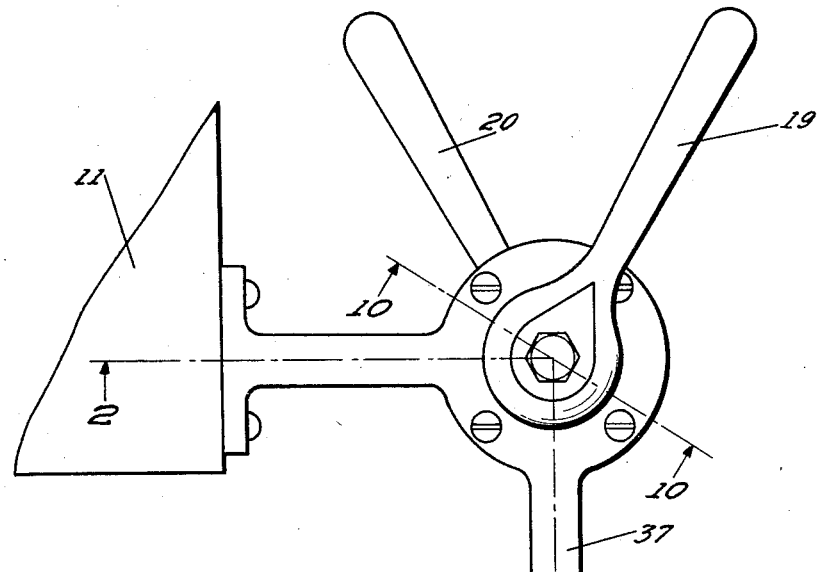
Figure 1 is a side elevation of the improved gang faucet of this invention.

The reference numeral 11 indicates a portion of a dispenser or container for various liquids, such as beverages or the like, and in the particular embodiment of the invention the container and faucet are adapted for the ready distribution of fruit juices, extracts, and water under pressure which may be mixed with the concentrated fruit juices or extracts in the act of dispensing so as to produce a suitable beverage. The particular embodiment of the invention contemplates the distribution, mixing, and dispensing of various citrus fruit juices, such as orange juice, lemon juice, and grapefruit juice with water to produce beverages. The faucet is also adapted for the dispensing of pure water when desired.

For reference purposes, the various ports and the like will be indicated as follows: the reference numeral 12 as that through which orange juice or extract is handled; the port indicated by the reference numeral 13 may be for lemon juice; 14 for water; and 15 for grapefruit juice, although obviously any other liquids or mixtures thereof can be used or dispensed with faucets of this type, which may also have more or less ports, if desired or necessary.

In the practical operation of this apparatus, the juice or extracts flowing through the ports 12, 13, and 15 are mixed with water flowing through the port 14 at the time of dispensing. The orange, lemon and grapefruit juices are drawn from separate containers in the dispenser 11, and the channel 14 for the water is preferably connected directly to the source of city water supply or the like whereby water under pressure is delivered to this channel, this pressure being amply sufficient to thoroughly mix the substances involved, and the dimensions of the ports and channels themselves are such that the exact quantity of the flavoring substance desired is always provided, thereby always assuring the customer of a finished beverage of uniform quality. Obviously, the juice in the container and the water may be cooled before dispensing. An actual dispensing and mixing operation is accomplished by providing suitable connecting channels in rotatable cylinders 16 and 17 mounted in the casing 18 of the faucet.

The cylinders are adapted to be rotated by suitable handles 19 and 20 which operate through shafts and connections 26 held in place in the casing 18 by caps 27, and the inner ends of the shafts 26 are formed with flattened projections 28 which fit into suitable slots 29 in the cylinders 16 and 17, one at each end of the casing. The cylinders are so positioned in the casing that a vertical positioning of the handles will stop the flow of either juice or water through any or all of the ports. A forward or backward movement of either handle will result in a dispensing of one of the mixed beverages or of water as desired.

Figures 2, 10:
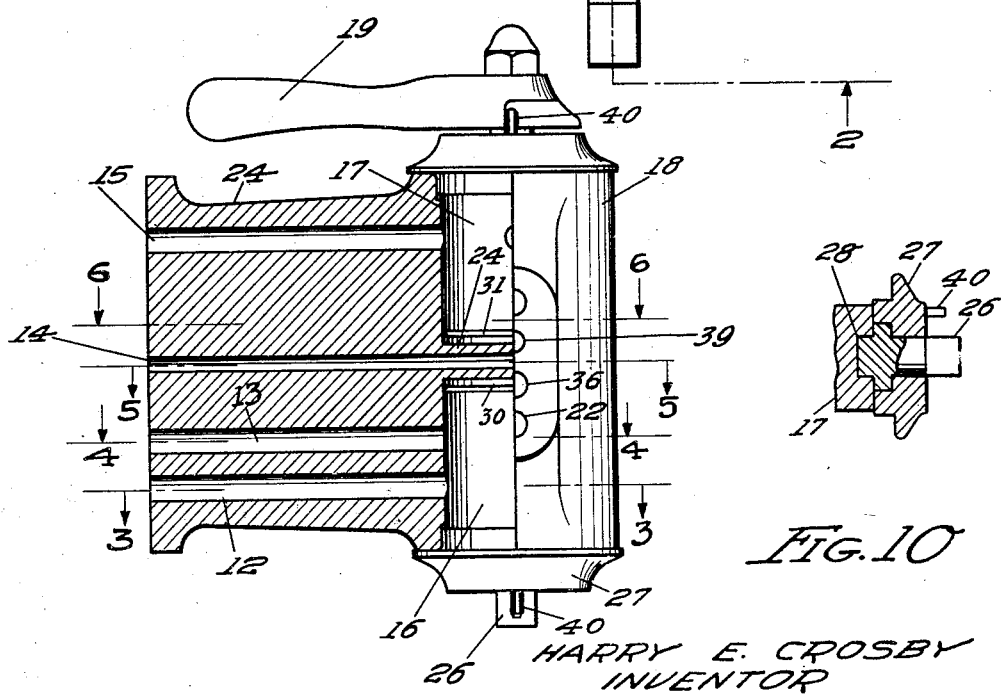
Figure 2 is a sectional view taken on the broken line 2—2 of Figure 1, looking in the direction indicated by the arrows, but showing the operating parts in different positions.
Figure 10 is a partial sectional view taken on the line 10—10 of Figure 1.
Figure 3:
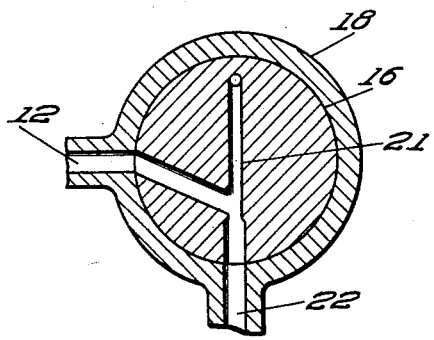
Figure 3 is a section on the line 3—3 of Figure 2.
Figure 5:
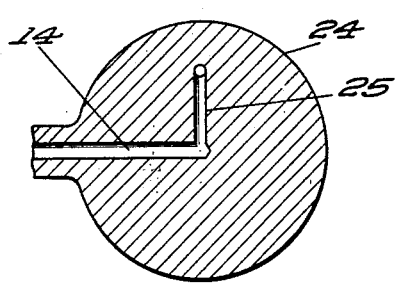
Figure 5 is a section on the line 5—5 of Figure 2.

For example, a rotation of the cylinder 16 into the position shown in Figure 3 will cause a Y-shaped system of channels 21 in the cylinder to become aligned with the inlet port 12 for orange juice on one side, and with the corresponding outlet 22 on the other side, while at the same time the other arm of the Y-shaped channel is aligned with an inlet port for water, which inlet port forms a continuation of the arms 23 of a T-shaped channel formed at the inner extremity of the water inlet 14 which passes directly into a central portion 24 of the faucet casing, this central portion being integral with the casing as best shown in Figures 2 and 5. From an inspection of Figure 5, it will be noted that the water inlet channel 14 is turned upwardly as at 25, this forming a vertical portion of the T-shaped channel of which the cross-channels 23 form the upper horizontal branches.

Figure 7:
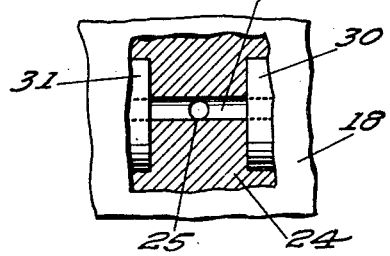
Figure 7 is a top view of the central portion of the faucet casing, parts being broken away to show the interior construction.
Figure 8:
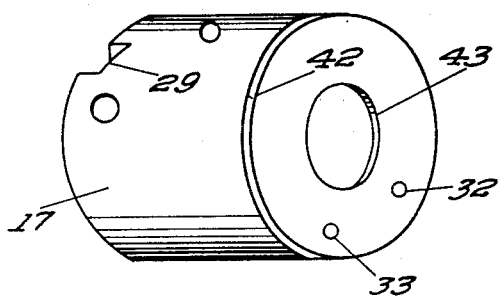
Figure 8 is a perspective view of one of the rotatable dispensing cylinders in the faucet.

Leather or other suitable washers 30 and 31 are positioned adjacent the inner ends of the cylinders 16 and 17 respectively, and abut against the integral portion 24 of the housing 18. Each of these leather washers has an opening therethrough in its upper end as shown by the dotted lines in Figure 7, and the water flowing through the channel 14—25—23 enters these openings in the washers 30 and 31, and if the handles 19 and 20 are in a vertical position will flow no further, as the solid face of one of the cylinders 16 or 17 will abut thereagainst. However, when the cylinder is turned either forwardly or rearwardly by the action of its corresponding handle, one of the ports 32 or 33 in the cylinder will become aligned with the opening in the corresponding washer, and water will accordingly flow into the cylinder, which will then be in a position shown in Figure 3, and will join the juice flowing through the inlet 12, the resultant mixture thence passing through the outlet 22.

Figure 4:
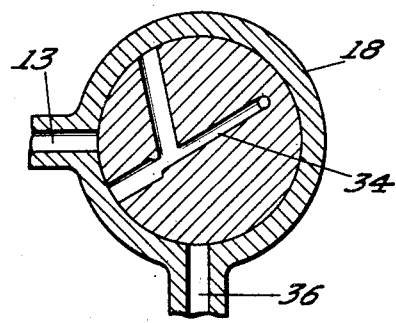
Figure 4 is a section on the line 4—4 of Figure 2.

When the roller 16 is in this position with respect to the orange juice inlet 12, another set of Y-shaped ports 34 in this same cylinder will be in position shown in Figure 4. These particular apertures connect with the inlet 13 for lemon juice, and allow the mixture of lemon juice and water to pass through the corresponding outlet 36 when the handle is moved to a rearward position as distinguished from the forward position shown in Figure 1. It will be noted that the dispensing outlets for the various beverages and the water are quite close together as shown in Figure 2, this being accomplished by tapering of the down-spout 37 in which all these ports are formed.

Figure 6:
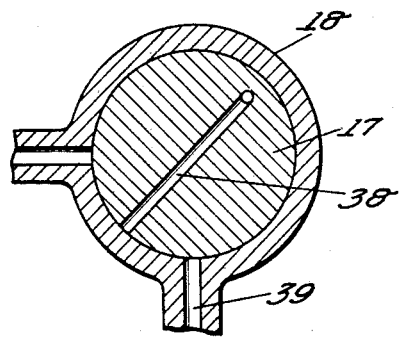
Figure 6 is a section on the line 6—6 of Figure 2.

The roller or cylinder 17 is adapted for the dispensing of pure water and also for the dispensing of grapefruit juice mixed with water, the port for water distribution being illustrated in Figure 6, and comprising a single narrow channel 38, which when the handle 20 is turned into proper position will be aligned with the outlet 39 allowing water to flow therethrough. So far as the grapefruit juice dispenser is concerned, a set of channels similar to those shown at 21 and 34 in Figures 3 and 4 respectively are provided in the cylinder 17, and when the handle is moved into the proper position, a dispensing of this product will occur. Stops in the form of pins 40 operating in suitable cut-away portions of the handle structure are provided so that an exact alignment of the ports and channels results at all times.

Figure 9:
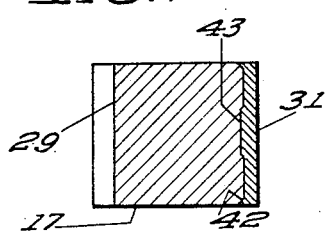
Figure 9 is a sectional view of one of the cylinders showing association with the leak-preventing washer.

In Figure 9 is shown a view of one of the cylinders associated with its corresponding washer, and it will be noted that the cylinder has beveled edges 42 at one end and is also provided with a central depression 43. The material such as leather or the like of the washer 31 being sufficiently pliable to become fitted into closely adjacent relation with the beveled edges and the depression when pressure is applied, thereby affording a non-leakable joint between these parts, and the combination will also act as sending points or pivots.

It will be evident that herein is provided a faucet for dispensing beverages or the like which can be accommodated to readily and conveniently dispense a plurality of various beverages or other liquids while at the same time a suitable mixing of the beverage extracts with water is accomplished, and additionally, a positively operating and leakproof device results.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A gang faucet, comprising a casing, a plurality of inlet ports and corresponding outlet ports in the casing, and stop means for the ports in the casing, said stop means comprising rotatable cylinders, said cylinders having channels therein for connecting the inlet and outlet ports, and also for connecting certain selected inlet ports to a common outlet, one of said inlet ports being adapted for connection through the cylinders to any selected one of the remaining inlet ports.

2. A beverage dispensing gang faucet, having a plurality of extract inlets therein together with a water inlet and means for delivering water from the water inlet to the extract from any one of the extract inlets, said means including a T-shaped channel termination for the water inlet, a rotatable cylinder normally abutting each open end of said T-shaped inlet, and channels in the cylinders adapted to be simultaneously aligned with the water inlet, an extract inlet and an outlet port.

3. A beverage dispensing gang faucet, having a plurality of extract inlets therein together with a water inlet and means for delivering water from the water inlet to the extract from any one of the extract inlets, said means including a T-shaped channel termination for the water inlet, a rotatable cylinder normally abutting each open end of said T-shaped inlet, and channels in the cylinders adapted to be simultaneously aligned with the water inlet, an extract inlet and an outlet port, and washers adjacent the ends of the cylinders.

4. A beverage dispensing gang faucet, having a plurality of extract inlets therein together with a water inlet and means for delivering water from the water inlet to the extract from any one of the extract inlets, said means including a T-shaped channel termination for the water inlet, a rotatable cylinder normally abutting each open end of said T-shaped inlet, and channels in the cylinders adapted to be simultaneously aligned with the water inlet, an extract inlet and an outlet port, and washers adjacent the ends of the cylinders, said washers having openings therein for passage of water therethrough from the T-shaped inlet port to the corresponding channel in the cylinder.

5. A beverage dispensing gang faucet, having a plurality of extract inlets therein together with a water inlet and means for delivering water from the water inlet to the extract from any one of the extract inlets, said means including a T-shaped channel termination for the water inlet, a rotatable cylinder normally abutting each open end of said T-shaped inlet, and channels in the cylinders adapted to be simultaneously aligned with the water inlet, an extract inlet and an outlet port, and washers adjacent the ends of the cylinders, together with a central depression in the end face of each cylinder, and beveled edges around the peripheral edge of the cylinder into which depression and space portions of the washer are extruded by pressure.

6. A beverage dispensing gang faucet, having a plurality of extract inlets therein together with a water inlet and means for delivering water from the water inlet to the extract from any one of the extract inlets, said means including a T-shaped channel termination for the water inlet, a rotatable cylinder normally abutting each open end of said T-shaped inlet, and channels in the cylinders adapted to be simultaneously aligned with the water inlet, an extract inlet and an outlet port, and washers adjacent the ends of the cylinders, together with a central depression in the end face of each cylinder, and beveled edges around the peripheral edge of the cylinder into which depression and space portions of the washer are extruded by pressure to form a leak-proof joint and to centrally pivot the cylinder.

In testimony whereof I affix my signature.

HARRY E. CROSBY.